United States Patent [19]

Strong et al.

[11] Patent Number: 5,473,026
[45] Date of Patent: Dec. 5, 1995

[54] MOISTURE-CURABLE HOT MELT SILICONE PRESSURE-SENSITIVE ADHESIVES

[75] Inventors: Michael R. Strong; Martin E. Cifuentes; Bernard VanWert; William J. Schoenherr, all of Midland, Mich.

[73] Assignee: Dow Corning Corporation, Midland, Mich.

[21] Appl. No.: 262,791

[22] Filed: Jun. 20, 1994

[51] Int. Cl.$^6$ .................................................. C08L 83/06
[52] U.S. Cl. .............................................. 525/477; 528/17
[58] Field of Search ............................................. 525/477

[56] References Cited

U.S. PATENT DOCUMENTS

| | | | |
|---|---|---|---|
| 2,676,182 | 4/1954 | Daudt et al. | 260/448.2 |
| 4,143,088 | 3/1979 | Favre et al. | 260/825 |
| 4,584,554 | 4/1986 | Blizzard et al. | 525/477 |
| 4,585,836 | 4/1986 | Homan et al. | 525/477 |
| 4,591,225 | 5/1986 | Blizzard et al. | 525/477 |
| 5,091,484 | 2/1992 | Colas et al. | 525/477 |
| 5,208,300 | 5/1993 | Krahnke et al. | 525/474 |
| 5,210,156 | 5/1993 | Clark et al. | 525/477 |

FOREIGN PATENT DOCUMENTS

| | | | |
|---|---|---|---|
| 481487 | 3/1992 | Japan | C09J 183/04 |

*Primary Examiner*—Melvyn I. Marquis
*Assistant Examiner*—Margaret W. Glass
*Attorney, Agent, or Firm*—Sharon K. Severance

[57] ABSTRACT

A moisture-curable silicone hot melt pressure sensitive adhesive composition is disclosed, said composition comprising: (A) a solid alkoxy functional organopolysiloxane resin containing curing radicals of the formula $-ZSiR^1_x(OR^2)_{3-x}$; wherein $R^1$ is a monovalent hydrocarbon radical, $R^2$ is selected from the group consisting of a alkyl radical and alkoxyalkyl radical, Z is a divalent linking radical, and the subscript x has a value of 0 or 1; (B) a diorganopolysiloxane polymer, each terminal group thereof containing at least one silicon-bonded hydrolyzable functional radical selected from the group consisting of alkoxy radicals having 1 to 4 carbon atoms, ketoxime radicals, aminoxy radicals, acetamido radicals, N-methylacetamido radicals and acetoxy radicals; said polymer having a viscosity at 25° C. of 20 to <100,000 mm$^2$/s, and the weight ratio of said resin to said polymer being in the range 40:60 to 80:20; and (C) sufficient catalyst to accelerate the cure of said composition; said composition being an essentially solvent-free, non-slump solid at room temperature which cures to an essentially non-tacky elastomer upon exposure to moisture.

32 Claims, No Drawings

5,473,026

MOISTURE-CURABLE HOT MELT SILICONE PRESSURE-SENSITIVE ADHESIVES

BACKGROUND OF THE INVENTION

The present invention relates to a silicone pressure-sensitive adhesive composition. More particularly, the invention relates to a hot melt adhesive which cures upon exposure to ambient moisture.

Silicone pressure-sensitive adhesives (hereinafter also referred to as PSAs) typically contain at least two primary components, namely a linear siloxane polymer and a tackifier resin consisting essentially of triorganosiloxane (M) units (i.e., $R_3SiO_{1/2}$ units, in which R denotes a monovalent organic group) and silicate (Q) units (i.e., $SiO_{4/2}$ units). In addition to the above two ingredients, silicone PSA compositions are generally provided with some crosslinking means (e.g., peroxide or hydrosilylation cure systems) in order to optimize various properties of the final adhesive product. In view of the high viscosity imparted by the polymer component, these PSA compositions are typically dispersed in an organic solvent for ease of application.

A copending application Ser. No. 08/063,105 which is a continuation of U.S. patent application Ser. No. 07/748,478, filed on May 14, 1993 (EP Publication 529841A1) to Krahnke et al. describes silicone PSAs that cure in the presence of moisture to permanent adhesives. The compositions are particularly useful as structural adhesives for adhering glass panels to structural materials such as concrete, aluminum and steel. The two required ingredients of the PSA are an MQ resin and a high consistency polydiorganosiloxane gum. One or both ingredients of the PSA compositions described in this copending application contain moisture activated alkoxy curing groups. Due to the high viscosity of gum type polydiorganosiloxanes even at elevated temperatures, the compositions are not suitable for application as heated molten materials and are typically applied in solution form wherein the solvent is removed prior to curing of the composition or evaporates during the curing reaction.

Another moisture-curable PSA system is disclosed in Japanese laid open patent application (Kokai) No. 4(1992)/81,487. These PSAs comprise (1) 100 parts by weight of an MQ resin having a hydroxyl content of up to 0.7 weight percent, (2) a liquid polydiorganosiloxane containing hydrolyzable terminal groups and (3) a condensation catalyst to promote curing of the composition in the presence of moisture. The molar ratio of silanol groups in the resinous copolymer to hydrolyzable terminal groups in the liquid polydiorganosiloxane is from 1 to 10. A characterizing feature of these compositions is their ability to retain the characteristics of pressure sensitive adhesives under both dry and wet conditions following reaction of the moisture reactive groups.

U.S. Pat. No. 5,091,484 to Colas et al. describes elastomer-forming compositions containing (1) a hydroxyl- or alkoxy-terminated polydiorganosiloxane, (2) an alkoxy-functional MQ resin that is preferably liquid under ambient conditions and (3) a titanium-containing curing catalyst. These compositions are described as flowable under ambient conditions and cure in the presence of atmospheric moisture to yield elastomeric materials. The resins of Colas are produced by reacting a —SiH site on the resin with a alkenyl containing alkoxy silane in the presence of platinum.

Moisture-curable compositions which cure to elastomers are also disclosed by Favre et al. in U.S. Pat. No. 4,143,088. These compositions are prepared by mixing (a) a hydroxyl-terminated polydiorganosiloxane, (b) an MQ resin, (c) an alkoxylated organosilicon compound and (d) an organic titanium derivative. Before being cured, these systems are liquids under ordinary conditions.

Copending U.S. patent application Ser. No. 08/076,615 to Cifuentes et al., commonly owned, discloses a hot melt composition comprising (i) a solid hydroxyl-functional MQ resin, (b) a diorganopolysiloxane polymer containing at least two terminal alkoxy radicals, (iii) a hydrolyzable silane and (iv) a cure catalyst. These compositions have a high initial adhesive strength and cure in the presence of moisture to non-tacky elastomers.

It has now been found that the strength properties and adhesive strength at elevated temperatures can be improved by the use of an alkoxy/hydroxyl functional MQ resin wherein some or all of the hydroxyl groups on the MQ resin have been replaced with alkoxy functionality.

It is an object of the instant invention to show a moisture-curable pressure sensitive adhesive composition which has improved strength properties, adhesive strength at elevated temperature and storage stability.

SUMMARY OF THE INVENTION

The present invention therefore relates to a moisture-curable silicone pressure-sensitive adhesive composition comprising:

(A) a solid alkoxy functional organopolysiloxane resin containing curing radicals of the formula $-ZSiR^1_x(OR^2)_{3-x}$ produced by the method comprising reacting (i) a hydroxyl functional organopolysiloxane resin comprising $R_3SiO_{1/2}$ siloxane units and $SiO_{4/2}$ siloxane units, wherein the mole ratio of the $R_3SiO_{1/2}$ siloxane units to $SiO_{4/2}$ siloxane units has a value of from 0.5/1 to 1.2/1, and said hydroxyl content is 0.1 to 6 weight percent based on solids as determined by FTIR; with (ii) an alkoxy compound having the formula $YSiR^1_x(OR^2)_{3-x}$; wherein R is selected from the group consisting of hydrocarbon radicals and halogenated hydrocarbon radicals, $R^1$ is a monovalent hydrocarbon radical, $R^2$ is selected from the group consisting of a alkyl radical and alkoxyalkyl radical, Z is a divalent linking radical, Y is a radical which is reactive with the hydroxyl groups in the resin, and the subscript x has a value of 0 or 1;

(B) a diorganopolysiloxane polymer, each terminal group thereof containing at least one silicon-bonded hydrolyzable functional radical selected from the group consisting of hydroxyl radicals, alkoxy radicals having 1 to 4 carbon atoms, ketoxime radicals, aminoxy radicals, acetamido radicals, N-methylacetamido radicals and acetoxy radicals; said polymer having a viscosity at 25° C. of 20 to <100,000 $mm^2/s$ and the weight ratio of said resin to said polymer being in the range 40:60 to 80:20;

(C) sufficient catalyst to accelerate the cure of said composition;

(D) optionally, a silane represented by monomers of the formula $R^4_{4-y}SiX_y$ or oligomeric reaction products thereof, in which $R^4$ is selected from the group consisting of hydrocarbon radicals and substituted hydrocarbon radical having 1–6 carbon atoms, X is a hydrolyzable group and y is 2 to 4; and (E) optionally, a filler.

The compositions of the instant invention are non-slump solids under ambient conditions but can be heated to a flowable liquid state and applied as such to substrates by methods employed to dispense hot melt organic adhesives. Further, the compositions of the instant invention can be stored as one part systems, for extended periods and cure to essentially non-tacky elastomers when exposed to moisture providing an even stronger bond than its corresponding green strength value. Finally the compositions of the instant invention show improved adhesive strength at elevated temperatures.

DETAILED DESCRIPTION OF THE INVENTION

Component (A) of the present invention is a solid alkoxy functional organopolysiloxane resin containing curing radicals of the formula —$ZSiR^1_x(OR^2)_{3-x}$. The solid alkoxy functional organopolysiloxane resins of the instant invention are produced by the method comprising reacting (i) a hydroxyl functional organopolysiloxane resin comprising $R_3SiO_{1/2}$ siloxane units and $SiO_{4/2}$ siloxane units, wherein the mole ratio of the $R_3SiO_{1/2}$ siloxane units to $SiO_{4/2}$ siloxane units has a value of from 0.5/1 to 1.2/1, and said hydroxyl content is 0.1 to 6 weight percent based on solids as determined by FTIR, with (ii) a solid alkoxy compound having the formula $YSiR^1_x(OR^2)_{3-x}$; wherein R is selected from the group consisting of hydrocarbon radicals and halogenated hydrocarbon radicals, $R^1$ is a monovalent hydrocarbon radical, $R^2$ is selected from the group consisting of a alkyl radical and alkoxyalkyl radical, Z is a divalent linking radical, Y is a radical which is reactive with the hydroxyl groups in the resin, and the subscript x has a value of 0 or 1.

In the formula for the hydroxyl functional resin (i), R denotes a monovalent radical selected from the group consisting of hydrocarbon and halogenated hydrocarbon radicals, preferably having less than 20 carbon atoms, and most preferably having from 1 to 10 carbon atoms. Examples of suitable R radicals include alkyl radicals, such as methyl, ethyl, propyl, pentyl, octyl, undecyl and octadecyl; cycloaliphatic radicals, such as cyclohexyl; aryl radicals such as phenyl, tolyl, xylyl, benzyl, alpha-methyl styryl and 2-phenylethyl; alkenyl radicals such as vinyl; and chlorinated hydrocarbon radicals such as 3-chloropropyl and dichlorophenyl.

Preferably, at least one-third, and more preferably substantially all R radical in the formula for the hydroxyl functional resin (i), are methyl radicals. Examples of preferred $R_3SiO_{1/2}$ siloxane units include $Me_3SiO_{1/2}$, $ViMe_2SiO_{1/2}$, $PhMe_2SiO_{1/2}$ and $Ph_2MeSiO_{1/2}$ where Me hereinafter denotes methyl, Ph hereinafter denotes phenyl and Vi hereinafter denotes vinyl.

The hydroxyl-functional resin (i) includes a resinous portion wherein the $R_3SiO_{1/2}$ siloxane units (i.e., M units) are bonded to the $SiO_{4/2}$ siloxane units (i.e., Q units), each of which is bonded to at least one other $SiO_{4/2}$ siloxane unit. Some $SiO_{4/2}$ siloxane units are bonded to hydroxyl radicals resulting in $HOSiO_{3/2}$ units (i.e., TOH units), thereby accounting for the silicon-bonded hydroxyl content of the organopolysiloxane. In addition to the resinous portion, the hydroxy-functional resins (i) can contain a small amount of a low molecular weight material comprised substantially of a neopentamer organopolysiloxane having the formula $(R_3SiO)_4Si$, the latter material being a byproduct in the preparation of the resin according to the methods of Daudt et al., described infra.

For the purposes of the present invention, the ratio of $R_3SiO_{1/2}$ siloxane units to $SiO_{4/2}$ siloxane units has a molar ratio of 0.5 to 1.2, respectively. It is preferred that the mole ratio of the total M siloxane units to total Q siloxane units of the hydroxyl functional resin (i) be between 0.6 and 1.0. The above M/Q mole ratios can be easily obtained by $^{29}Si$ nuclear magnetic resonance, this technique being capable of a quantitative determination of the molar contents of: M (resin), M(neopentamer), Q (resin), Q(neopentamer) and TOH. For the purposes of the present invention, the M/Q ratio:

{M(resin)+M(neopentamer)}/{Q(resin)+Q(neopentamer)} represents the ratio of the total number of triorganosiloxy groups of the resinous and neopentamer portions to the total number of silicate groups of the resinous and neopentamer portions. It will, of course, be understood that the above definition of the M/Q mole ratio accounts for the neopentamer resulting from the preparation of the hydroxyl-functional resin (i) and not for any intentional addition of neopentamer.

In order to produce solid alkoxy functional resins it is preferred that the hydroxyl-functional resin (i) be a solid at room temperature. That is, it must have a softening point above ambient, preferably above 40° C. When this condition is not realized, the PSAs obtained do not exhibit the required non-slump character, as defined infra.

It is further preferred that the resinous portion of the hydroxyl-functional resin (i) have a number average molecular weight (Mn) of about 1,500 to 15,000 when measured by gel permeation chromatography (GPC), the neopentamer peak being excluded from the measurement. In this molecular weight determination, narrow fractions of MQ resins are used to calibrate the GPC equipment, the absolute molecular weights of the fractions being first ascertained by a technique such as vapor phase osmometry. This molecular weight is preferably above about 3,000, most preferably 4,000 to 7,500.

The hydroxyl-functional resin (i) can be prepared by well known methods. It is preferably prepared by the silica hydrosol capping process of Daudt, et al., U.S. Pat. No. 2,676,182; as modified by Brady, U.S. Pat. No. 3,627,851; and Flannigan, U.S. Pat. No. 3,772,247; each patent being incorporated herein by reference to teach how to prepare soluble organopolysiloxanes which meet the requirements of the present invention. These methods employ an organic solvent, such as toluene or xylene, and provide a solution wherein the resin typically has a hydroxyl content of at least 1.2 percent by weight, preferably 2.5 to 4.5 percent by weight based on solids and as determined by FTIR.

The hydroxyl-functional resin (i) may be capped to reduce the hydroxyl content prior to or following the reaction with the alkoxy compound (ii). Methods for producing capped organopolysiloxane resins are well known in the art. A capped organopolysiloxane resin may be prepared by first preparing an untreated resin copolymer according to any of the methods described above and thereafter, treating an organic solvent solution of the untreated resin copolymer with a suitable endblocking agent to reduce the amount of silicon-bonded hydroxyl units to reduce the amount of silicon-bonded hydroxyl units to less than about 1 weight percent, preferably less than 0.5 wt %. Endblocking agents capable of providing endblocking triorganosilyl units are commonly employed as silylating agents and a wide variety of agents are known and disclosed in U.S. Pat. Nos. 4,584, 355 and 4,591,622 to Blizzard, et al., and U.S. Pat. No. 4,585,836 to Homan, et al. which are hereby incorporated by reference. A single endblocking agent such as hexamethyldisilazane can be used or a mixture of such agents can be used. The procedure for treating the resin copolymer may be simply to mix the endblocking agent with a solvent solution of the resin copolymer and allowing the by-products to be removed. Preferably, an acid catalyst is added and the mixture is heated to reflux conditions for a few hours.

The hydroxyl functional organopolysiloxane resin (i) is reacted with (ii) an alkoxy compound having the formula $YSiR^1_x(OR^2)_{3-x}$ to produce the alkoxy functional resins (A) of the instant invention. In the formula for the alkoxy compound (ii) $R^1$ is a monovalent hydrocarbon radical having from 1 to 10, preferably 1 to 6 carbon atoms. $R^1$ may be exemplified by, but not limited to, alkyl radicals such as methyl, ethyl, propyl, and isopropyl; alkenyl radicals such as vinyl; and aryl radicals such as phenyl. $R^1$ is preferably methyl.

$R^2$ is a alkyl or alkoxyalkyl radical, preferably having less than 5 carbon atoms. $R^2$ may be exemplified by, but not limited to methyl, ethyl, isopropyl, methoxyethyl, or ethoxyethyl. $R^2$ is preferably methyl.

Y in the preceding formula for the alkoxy compound (ii) is a radical which is capable of reacting with the hydroxyl groups on the hydroxyl-functional resin (i) to form a divalent linking radical Z. Preferably Y bears a silicon-bonded hydrolyzable radical such as halogen, acyloxy, amino, amido, and others. In view of the type of by products that are produced during the reaction Y preferably bears an amino nitrogen which provides an ammonia by-product.

The Z radical, produced during the reaction between the hydroxyl-functional resin (i) and alkoxy compound (ii), is a divalent linking radical linking the silicon atom of the curing radical to a silicon atom of the resin. Z is typically selected from the types of divalent radicals that are used to link silicon atoms in a hydrolytically stable manner and include, but are not limited to, oxygen; hydrocarbons such as alkylene, for example ethylene, propylene, and isobutylene and phenylene; hydrocarbon containing one or more hetero atoms selected from oxygen, nitrogen and sulfur, for example, ether-, thioether-, ester- or amide-containing hydrocarbon; siloxane for example polydimethylsiloxane; and combinations thereof.

Preferably, Z is selected from the group of radicals having the formula $-D(Me_2SiO)_a(Me_2SiC_2H_4)_b-$ wherein Me denotes methyl, D denotes oxygen ($-O-$) or $-CH_2CH_2-$, subscript a has a value of 0 to 2, preferably 1, and subscript b has a value of 0 to 6, preferably 0 or 1, the sum of a+b≧0. Z may be exemplified by, but not limited to, $-CH_2CH_2(OSiMe_2)-$, $-O(Me_2SiCH_2CH_2)-$, $-CH_2CH_2(OSiMe_2)(Me_2SiCH_2CH_2)-$, $-O(OSiMe_2)(Me_2SiCH_2CH_2)-$, $-CH_2CH_2(Me_2SiCH_2CH_2)-$, $-CH_2CH_2-$, $-O(Me_2SiO)-$ and $-O-$. Most preferably Z contains an ethylene linkage bonded to the silicon containing the $-OR^2$ radicals.

Specific examples of suitable curing radicals include, but are not limited to, $-CH_2CH_2Si(OMe)_3$, $-OSi(OMe)_3$, $-OSi(OMe)_2Me$, $-O(Me_2)SiCH_2CH_2(Me_2)SiCH_2CH_2Si(OMe)_3$, $-O(Me_2)SiCH_2CH_2Si(OMe)_3$, $-O(Me_2)SiO(Me_2)SiCH_2CH_2Si(OMe)_3$, and $-CH_2CH_2(Me_2)SiO(Me_2)SiCH_2CH_2Si(OMe)_3$. A highly preferred curing radical for the composition of this invention is $(MeO)_3SiCH_2CH_2Si(Me_2)O-$ because it can be readily introduced on the resin by way of a disilazane.

Silazanes and disilazanes are preferred compound alkoxy compounds (ii) for producing the alkoxy functional resins of the instant invention in view of the by-products that will be produced during the reaction. Examples of silazanes and disilazanes include, but are not limited to $(MeO)_3Si(CH_2CH_2SiMe_2)_a(OSiMe_2)_bNH_2$, and $\{(MeO)_3Si(CH_2CH_2SiMe_2)_a(OSiMe_2)_b\}_2NH$, such as $\{(MeO)_3SiCH_2CH_2SiMe_2\}NH$ wherein Me denotes methyl, subscript a has a value of 0 to 2, preferably 1, and subscript b has a value of 0 to 6, preferably 0 or 1.

The reaction between the hydroxyl-functional organopolysiloxane (i) and alkoxy compound (ii) may be carried out in the presence of heat and optionally a process catalyst. Suitable process catalysts include, but are not limited to, tetra n-butyltitanate, dibutyltin dilaurate, stannous octonate, and trifluoroacetic acid. Any catalyst known in the art that is useful in facilitating the reaction between the hydroxyl-functional organopolysiloxane (i) and alkoxy compound (ii) may be used in the instant invention. It is preferred to heat the reaction to a temperature of 50° C. to 130° C. It may be necessary to neutralize the process catalyst before further processing.

The amount of hydroxyl-functional organopolysiloxane resin (i) and alkoxy compound (ii) reacted to produce the alkoxy-functional resin of the instant invention is not specifically limited but should be sufficient to replace some or all of the hydroxyl groups on the resin with curing radicals of the formula $-ZSiR^1_x(OR^2)_{3-x}$. It is preferred to convert only some of the hydroxyl groups on the resin to alkoxy functionality while the remaining hydroxyl groups on the resin are left unreacted, capped with a non-reactive functional group, or treated with a hydrolyzable silane or fluid.

The alkoxy-functional organopolysiloxane resin (A) must be a solid at room temperature. That is, it must have a softening point above ambient, preferably above 40° C. When this condition is not realized, the PSAs obtained do not exhibit the required non-slump character, as defined infra.

Component (B) of the present invention is a diorganopolysiloxane polymer, each terminal group thereof containing at least one, preferably two, silicon-bonded hydrolyzable functional radicals selected from the group consisting of hydroxyl radicals, alkoxy radicals having 1 to 4 carbon atoms, ketoxime radicals, aminoxy radicals, acetamido radicals, N-methylacetamido radicals and acetoxy radicals. The repeat units of diorganopolysiloxane (B) are $R_2SiO_{2/2}$ siloxy units wherein R is independently selected from the same hydrocarbon and halogenated hydrocarbon radicals delineated above for component (A). The terminal units of the diorganopolysiloxane (B) are $R^3_zR_{3-z}SiO_{2/2}$ units where R is as described above and $R^3$ is a hydrolyzable group and z has the value of 0 to 2.

Component (B) can comprise a single diorganopolysiloxane or a mixture of two or more different diorganopolysiloxanes. Component (B) should have a viscosity at 25° C. of about 20 to 100,000 mm²/s, preferably 350 to 60,000 mm²/s. It is preferred that at least 50%, and preferably at least 85%, of the organic radicals along the chain of component (B) are methyl radicals, which radicals can be distributed in any manner in the diorganopolysiloxane. Further, component (B) can contain siloxane branching sites provided it meets the above viscosity requirements. The side chains emanating from such branch points, of course, have terminal units which can also contain the above described hydrolyzable radicals.

The terminal units of diorganopolysiloxane (B) are selected from the group consisting of R, hydroxyl radicals, alkoxy radicals having 1 to 4 carbon atoms, ketoxime radicals, aminoxy radicals, acetamido, N-methylacetamido and acetoxy radicals. It is preferred that the terminal units contain at least one terminal group selected from the group consisting of alkoxy radicals having 1 to 4 carbon atoms, ketoxime radicals, aminoxy radicals, acetamido, N-methylacetamido and acetoxy radicals. When the hydrolyzable group is a hydroxyl radical or an alkoxy radical it is preferred that the diorganopolysiloxane contain at least two terminal hydrolyzable functional radicals.

The alkoxy radicals may be exemplified by the formula $—ZSiR^1_x(OR^2)_{3-x}$ wherein $R^1$, $R^2$, Z and subscript x are as defined above. The preparation of diorganopolysiloxane polymers having such alkoxy terminal groups is described in detail in above cited U.S. patent application Ser. No. 08/063,105 hereby incorporated by reference to teach these preparative methods. Alkoxy functional groups having the representative formulae $(MeO)_3SiO—$ and $Me(MeO)_2SiO—$ can be introduced into a silanol-terminated diorganopolysiloxane by compounds having the formulae $(MeO)_4Si$ and $Me(MeO)_3Si$, respectively, as is well known in the art.

The ketoxime radicals may be exemplified by general formula $—ONC(R^5)_2$, in which each $R^5$ independently represents an alkyl radical having 1 to 6 carbon atoms or a phenyl radical. Methods for producing diorganopolysiloxanes having ketoxime radicals are known in the art. The ketoxime radicals may be further exemplified by, but not limited to, dimethylketoxime, methylethylketoxime, and cyclohexanoxime.

Other hydrolyzable functional radicals may be exemplified by, but not limited to aminoxy radicals, acetamido radicals, N-methylacetamido radicals and acetoxy radicals.

The preferred diorganopolysiloxane (B) of the invention is a polydimethylsiloxane which is terminated with groups having the structures $(MeO)_3SiCH_2CH_2Si(Me_2)OSi(Me_2)CH_2CH_2—$, $(MeO)_3SiO—$ or $Me(MeO)_2SiO—$.

The hydrolyzable-functional diorganopolysiloxane (B) may be also prepared from a hydroxyl-functional diorganopolysiloxane by reacting the latter with a hydrolyzable-functional silane. This reaction is typically conducted in the presence of a suitable catalyst such as an alkyl titanate. Heating of the mixture may be required for the reaction to proceed at a useful rate. Alternatively, a hydroxyl-functional diorganopolysiloxane can be capped in-situ by reacting it with an hydrolyzable-functional silane in the presence of a solution of resin (A) and, preferably, also in the presence of a process catalyst. Suitable process catalysts include, but are not limited to, stannous octoate, a base or tetrabutyltitanate. It may be necessary, although not always required to neutralize the process catalyst upon completion of the reaction. When the process catalyst is a $Sn^{II}$ salt, the catalyst is de-activated thermally, or by an appropriate agent before further processing. Likewise, when the process catalyst is a base, such as potassium carbonate, this base is neutralized before further processing.

Hot melt PSA compositions of the present invention can be obtained when the weight ratio of resin solids (A) to diorganopolysiloxane polymer (B) is about 40:60 to 80:20, preferably 50:50 to 70:30 and most preferably 55:45 to 65:35. The precise ratio needed to form these systems can be ascertained for a given resin and polymer combination by routine experimentation based on the instant disclosure. When this ratio is below about 40:60, the compositions are fluids which do not exhibit non-slump character; when this ratio is above about 80:20, the compositions exhibit an increased tendency to produce embrittled materials upon cure (i.e., they do not form elastomers). By "non-slump" it is meant that the material appears to be a solid such that, when a 60 cc jar is filled to about one third capacity with the material and tipped on its side at room temperature (i.e., about 25° C.), essentially no flow is observed within a 20 minute period. This corresponds to a minimum room temperature dynamic viscosity in the approximate range $2\times10^7$ to $8\times10^7$ mPa.s when measured at 1 radian/sec. The hot melt compositions of the invention flow at elevated temperatures and can readily be extruded from a conventional hot melt gun (e.g., the dynamic viscosity is preferably of the order $10^4$ mPa.s at 200° C.).

The catalyst (C), which is used to accelerate the cure of the instant compositions upon exposure to moisture, may be selected from those compounds known in the art to promote the hydrolysis and subsequent condensation of hydrolyzable groups, in particular alkoxy groups. Suitable curing catalysts include, but are not limited to, metal salts of carboxylic acids, such as dibutyltin dilaurate and dibutyltin diacetate, stannous octanoate, ferrous octanoate, zinc napthenate, zinc octanoate, lead 2-ethylhexanoate; organotitanium compounds such as tetrabutyl titanate and 2,5-di-isopropoxy-bis(ethylacetate)titanium; and partially chelated derivatives of these salts with chelating agents such as acetoacetic acid esters and beta-diketones.

A sufficient quantity of catalyst (C) is added to accelerate the cure of the PSA composition. This amount can readily be determined by the skilled artisan through routine experimentation and is typically about 0.01 to 3 percent based on the combined weight of the resin and polymer solids.

Optional silane (D) of the present invention is represented by monomers of the formula $R^4_{4-y}SiX_y$ and oligomeric reaction products thereof; wherein $R^4$ is selected from the group consisting of hydrocarbon radicals and substituted hydrocarbon radicals having 1 to 6 carbon atoms. X in the above formula is a hydrolyzable group, preferably selected from alkoxy radicals having 1 to 4 carbon atoms, ketoxime radicals, aminoxy radicals, acetamido, N-methylacetamido or acetoxy radicals and y is 2 to 4, preferably 3 to 4. The ketoxime groups are of the general formula $—ONC(R^5)_2$, in which each $R^5$ independently represents an alkyl radical having 1 to 6 carbon atoms or a phenyl radical. Specific examples of preferred silanes include, but are not limited to methyltrimethoxysilane, methyltriethoxysilane, ethyltrimethoxysilane, propyltrimethoxysilane, tetramethoxysilane tetraethoxysilane, phenyltrimethoxysilane, isobutyltrimethoxysilane, glycidoxypropyltrimethoxysilane, aminoethylaminopropyltrimethoxysilane, methyltriacetoxysilane, ethyltriacetoxysilane, tetra(methylethyl ketoximo)silane, methyl-tris(methylethylketoximo)silane and vinyl-tris(methylethylketoximo)silane, and others.

Typically the silane (D) is added in amounts ranging from 0.01 to 10 weight percent, preferably from 0.3 to 5 weight percent based on the weight of (A) and (B). The silane may be added for several purposes including, but not limited to, to provide stability to the compositions, to cap any unreacted hydroxyl groups on the resin or fluid, and as an adhesion promoter. When a hydroxyl-functional polydiorganosiloxane is capped with a hydrolyzable functional silane in an in-situ process to produce (B), described previously, it will be understood that the amount of silane (D) to be added is in excess beyond that amount of hydrolyzable silane needed to cap all of the hydroxyl functionality.

The PSA compositions of the instant invention can be prepared in several ways. In one method the alkoxy functional organopolysiloxane resin (A) is prepared by reacting a hydroxyl functional organopolysiloxane resin with an alkoxy compound optionally using a process catalyst. The hydrolyzable-functional diorganopolysiloxane (B) is then mixed with an organic solvent solution of the resin (A). The solvent may then be stripped off to provide an essentially solvent-free composition. The catalyst (C) is then added to the solvent based or stripped product.

Another method comprises mixing together a hydroxyl-functional organopolysiloxane resin (i), alkoxy compound (ii) and the hydrolyzable-functional diorganopolysiloxane and thereafter heating the mixture to produce the alkoxy-functional organopolysiloxane resin. Typically the reaction is carried out in the presence of a solvent. The solvent may then be stripped off to provide an essentially solvent-free composition. The catalyst (C) is then added to the solvent based or stripped product.

In another method a hydroxyl-functional organopolysiloxane resin (i) and a hydroxy-functional diorganopolysiloxane polymer and an alkoxy compound (ii) are combined, preferably in the presence of a solvent and heated optionally in the presence of a process catalyst to produce both the alkoxy functional organopolysiloxane resin (A) and hydrolyzable-functional diorganopolysiloxane (B). Following this reaction, a capping agent may be added to cap all or some of any remaining hydroxyl groups. The solvent may then be stripped off to provide an essentially solvent-free composition. The catalyst (C) is then added to the solvent based or stripped product.

As described, the above methods for producing the compositions of the instant invention are preferably carried out in the presence of a solvent. The solvent is preferably the one used to prepare the resin component, for example, a hydrocarbon liquid such as benzene, toluene, xylene, heptane and others or a silicone liquid such as cyclic or linear polydiorganosiloxanes.

The stripping (devolatilization) of the PSA compositions can be effectively accomplished by heating the mixture under vacuum, for example at 90° C. to 150° C. and <100 millimeters of mercury in a batch operation. The removal of solvent can also be accomplished by any of the known techniques, such as contact with a stream of inert gas, evaporation, distillation, thin film stripping, and the like. Excessively high temperatures should be avoided when all the components are being devolatilized. A temperature of 200° C., and preferably 150° C., should not be exceeded.

It is, of course, understood that the above procedures are to be carried out in the absence of moisture in order to prevent premature curing of the compositions. This also applies to subsequent storage of the compositions.

In general, small amounts of additional ingredients may be added to the compositions of this invention. For example, antioxidants, pigments, stabilizers, and others, may be added as long as they do not materially alter the requirements stipulated herein.

In addition to the above mentioned components a filler may be optionally added to the compositions of this invention. The filler may be added in an amount up to 80 wt %, preferably up to 35 wt %. Fillers useful in the instant invention may be exemplified by, but not limited to, inorganic materials such as pyrogenic silica, precipitated silica and diatomaceous silica, ground quartz, aluminum silicates, mixed aluminum and magnesium silicates, zirconium silicate, mica powder, calcium carbonate, glass powder and fibers, titanium oxides of the pyrogenic oxide and rutile type, barium zirconate, barium sulphate, barium metaborate, boron nitride, lithopone, the oxides of iron, zinc, chrome, zirconium, and magnesium, the different forms of alumina (hydrated or anhydrous), graphite, conducting or non-conducting lamp blacks, asbestos, and calcined clay and organic materials such as the phthalocyaniines, cork powder, sawdust, synthetic fibers and synthetic polymers (polytetrafluoroethylene, polyethylene, polypropylene, polystyrene and polyvinyl chloride). The filler may be of a single type or mixtures of several types.

The hot melt PSA compositions of the instant invention may be applied to various substrates by techniques currently employed for dispensing organic hot melt formulations (e.g., hot melt gun, spraying, extrusion, spreading via heated draw-down bars, doctor blades or calendar rolls). The common factor in these methods is that the composition is heated to a temperature sufficient to induce flow before application. Upon cooling to ambient conditions, the compositions of the present invention are tacky, non-slump PSAs which may be used to bond components or substrates to one another. Alternatively, the bonding can take place while the adhesive is still hot, but the latter will not, of course, support much stress under these conditions. After the desired components are bonded with the PSA of the invention, the combination is exposed to ambient air so as to cure the PSA to an essentially non-tacky elastomer. Essentially tack-free herein indicates that the surface feels dry or nearly dry to the touch. The time required for completion of this cure process ranges from about a day to more than a month, depending upon the catalyst type, catalyst level, temperature and humidity, inter alia. As a result of this cure, the adhesive strength of the instant compositions is greatly augmented.

The compositions of this invention find utility in many of the same applications as now being served by silicone PSAs and/or organic hot melt adhesives, particularly in such industries as automotive, electronic, construction, space and medical. In these areas of application, the instant PSAs provide bonds which are resistant to hostile environments, such as heat and moisture.

So that those skilled in the art can understand and appreciate the invention taught herein, the following examples are presented, it being understood that these examples should not be used to limit the scope of this invention found in the claims attached hereto. All parts and percentages in the examples are on a weight basis and all measurements were obtained at 25° C., unless indicated to the contrary.

The following components were used in the examples.

RESIN 1 is a benzene soluble resinous copolymer containing triorganosiloxy units and $SiO_2$ units in the molar ratio of about 0.7 mol of triorganosiloxy units per mol of $SiO_2$ units, where the triorganosiloxy units are trimethylsiloxy and dimethylvinylsiloxy, and the copolymer contains about 1.88 weight percent of vinyl radicals.

RESIN 2 is a 72% solution in xylene of a solid MQ resin consisting essentially of trimethylsiloxy units and $SiO_{4/2}$ units in a molar ratio of about 0.8:1 and having a silicon-bonded hydroxyl content in solution of about 2.6 weight percent as measured by FTIR and a number average molecular weight (Mn) of about 5,000.

RESIN 3 is a 62% solution in xylene of Resin 2 wherein the resin has been capped with trimethylsiloxy groups so as to provide a residual silicon-bonded hydroxyl content in solution of about 0.27 weight percent as measured by a titration method wherein the resin is titrated with lithium aluminum di-n-butyl amide.

FLUID A is a triethoxysilyl-capped polydimethylsiloxane fluid having a viscosity of about 2,000 $mm^2/s$.

FLUID B is a hydroxy-endblocked polydimethylsiloxane fluid having a degree of polymerization of about 300 and a viscosity of about 2,000 mPa.s.

FLUID C is a hydroxy-endblocked polydimethylsiloxane fluid having a degree of polymerization of about 40 and a viscosity of about 75 $mm^2/s$.

FLUID D is a polydimethylsiloxane fluid having a viscosity of approximately 450 $mm^2/s$ terminated with the units of the formula $-CH_2CH_2Si(Me)_2OSi(Me)_2CH_2CH_2Si(OMe)_3$.

FLUID E is a methyldimethoxysiloxy-capped polydimethylsiloxane fluid having a viscosity of about 50 $mm^2/s$.

FLUID F is a hydroxy-endblocked polydimethylsiloxane fluid having a degree of polymerization of about 880 and a viscosity of about 55,000 $mm^2/s$.

FLUID G is a hydroxy-endblocked polydimethylsiloxane fluid having a degree of polymerization of about 570 and a viscosity of about 12,500 mPa.s.

FLUID H is a is a polydimethylsiloxane fluid having a viscosity of approximately 65,000 mm²/s terminated with the units of the formula —OSi(Me)₂OSi(Me)₂CH₂CH₂Si(OMe)₃.

HMDZ is hexamethyldisilazane.

SILAZANE is 1,3-Bis(trimethoxysilylethyl)-1,1,3,3-tetramethyldisilazane.

TBT is tetra n-butyl titanate

DBTDL is dibutyl tin dilaurate

TDIDE is 2,5-di-isopropoxy-bis(ethylacetate)titanium.

The number average molecular weight of the above described resins was determined by gel-permeation chromatography (GPC) using Varian TSK 4000+2500 columns at 35° C., a chloroform mobile phase at 1 mL/min and an IR detector set at 9.1 micrometers to detect Si-O-Si. The GPC was calibrated using narrow fractions of similar resins as standards. The Mn values reported herein exclude any neopentamer, $(Me_3SiO)_4Si$, present in the resin component.

The trimethylsiloxy/$SiO_{4/2}$ ratio of the resins was determined by $^{29}Si$ NMR and, in this case, the reported results include any neopentamer component present in the resin.

The hydroxyl content of the resins was measured by an FTIR procedure based on ASTM E-168. This method comprises comparing the absorbance of a specific band in the infrared spectrum of the resin with the absorbance of the same band in a reference spectrum of known concentration.

Adhesion Testing

Adhesive strength of PSA compositions was determined as a function of cure time under ambient conditions using a plastic box construction. The box construction comprised four integrally-formed side walls and a detachable, form-fitting bottom plate. The box had a generally rectangular cross-section measuring 3.5 cm wide ×6 cm long, had a wall height of 1.5 cm and had a wall thickness of 5 mm. Each side wall had a 3 mm wide recessed step along its bottom interior edge for receiving said bottom plate such that the exterior surface of the latter was flush with said edges when seated on said step.

In a typical adhesion evaluation, the plate was detached and a thin bead of molten PSA was extruded from a heated metal cartridge (approximately 130° C. to 150° C.) along the 3 mm wide step. The bottom plate was pressed into place so as to contact the adhesive on the step and thereby provide a box having an open top. The box additionally had external protrusions in two of its opposite walls which allowed it to be constrained in a special jig while the bottom plate was pushed out with the ram of an arbor press apparatus, the apparatus having been modified to measure the applied force. The force necessary to push the bottom plate out of the wall section was recorded and the test repeated on identical box constructions at various storage times at ambient conditions to asses adhesion and its improvement with cure.

COMPARATIVE EXAMPLE 1

Approximately 600.0 grams of Resin 1 was combined and reacted with 118.1 grams H(Me)₂SiOSi(Me)₂SiCH₂CH₂Si(OMe)₃ in the presence of 0.3 grams of a chloroplatinic acid complex of divinyltetramethyldisiloxane diluted with dimethylvinylsiloxy endblocked polydimethylsiloxane to provide 0.65 weight percent platinum. The mixture was allowed to mix and react overnight at room temperature. Resin 1' was recovered.

Approximately 70 grams of Resin 1' was combined with 13.6 grams of Fluid E. The mixture was de-volatilized at reduced pressure and at a ramped temperature up to 130° C. and held at that temperature for approximately 15 minutes. Once de-volatilized, the system was restored to atmospheric pressure and approximately 0.35 grams of aminopropyltrimethoxysilane was dispersed into the molten composition. The material was then recovered in a metal cartridge where it was allowed to cool to room temperature.

The resulting product was applied to the inside rim of a plastic PBT box using a hot melt gun as described above. Short term adhesive strength was monitored as a function of time.

| CURE TIME (room temp) | FORCE (N) |
| --- | --- |
| 20 min | 80.1 |
| 1 hr | 75.6 |
| 4 hr | 97.9 |
| 1 day | 218.0 |
| 7 days | 618.3 |
| 1 month | 720.6 |

The cured assembly (1 month) was then placed in a 150° C. oven for 30 minutes. The assembly was removed from the oven and immediately tested for the amount of force required to delaminate the lid from the box assembly. The result was 155.7 N.

COMPARATIVE EXAMPLE 2

Approximately 600.0 grams of Resin 1 was combined and reacted with 59.4 grams H(Me)₂SiOSi(Me)₂SiCH₂CH₂Si(OMe)₃ in the presence of 0.3 grams of a chloroplatinic acid complex of divinyltetramethyldisiloxane diluted with dimethylvinylsiloxy endblocked polydimethylsiloxane to provide 0.65 weight percent platinum. The mixture was allowed to mix and react overnight at room temperature. Resin 1" was recovered.

Approximately 70 grams of Resin 1" was combined with 21 grams of Fluid E. The mixture was de-volatilized at reduced pressure and at a ramped temperature up to 130° C. and held at that temperature for approximately 15 minutes. Once de-volatilized, the system was restored to atmospheric pressure and approximately 0.35 grams of aminopropyltrimethoxysilane was dispersed into the molten composition. The material was then recovered in a metal cartridge where it was allowed to cool to room temperature.

The resulting product was applied to the inside rim of a plastic PBT box using a hot melt gun as described above. Short term adhesive strength was monitored as a function of time.

| CURE TIME (room temp) | FORCE (N) |
| --- | --- |
| 20 min | 106.8 |
| 1 hr | 124.5 |
| 4 hr | 160.1 |
| 1 day | 266.9 |
| 7 days | 569.3 |
| 1 month | 840.7 |

The cured assembly (1 month) was then placed in a 150° C. oven for 30 minutes. The assembly was removed from the oven and immediately tested for the amount of force required to delaminate the lid from the box assembly. The result was 155.7 N.

COMPARATIVE EXAMPLE 3

Approximately 28 grams of Fluid A was combined and thoroughly mixed with 10.75 grams of methyltrimethoxysilane and 0.35 grams TBT in a 3-neck reaction flask. Approximately 58.3 grams of Resin 2 was then added and thoroughly mixed in with the other components in the reactor. The resultant mixture was heated to 60° C. and maintained at that temperature for approximately one hour, followed by devolatilization at reduced pressure and at a ramped temperature up to 150° C. Once devolatilized the system was restored to 1 atmosphere and 0.35 grams of TDIDE was dispersed into the molten product. The material was then transferred to the inside rim of a plastic PBT box using a hot melt gun as described above. Short term adhesive strength was monitored as a function of time.

| CURE TIME (room temp) | FORCE (N) |
| --- | --- |
| 20 min | 151.2 |
| 1 hr | 222.4 |
| 5 hr | 364.7 |
| 1 day | 471.5 |
| 7 days | 507.1 |

The cured assembly (1 month) was then placed in a 150° C. oven for 30 minutes. The assembly was removed from the oven and immediately tested for the amount of force required to delaminate the lid from the box assembly. The result was 44.5 N.

EXAMPLE 1

Using the amounts of components shown in Table 1, hot-melt pressure sensitive adhesives were prepared by loading Resin 2 and Fluid B into a flask under a $N_2$ sweep. The resin and fluid were blended well and heated to 100° C. Silazane was then added to the heated mixture. After 5 minutes, the $N_2$ sweep was stopped. Trifluoroacetic acid (TFAA) was then added and the $N_2$ sweep resumed with the head space cleared. The mixture was held for 1 hour at 100° C. HMDZ was added and the mixture held at 100° C. for an additional 1 hour with the $N_2$ sweep at a maximum, followed by devolatilization at reduced pressure and at a ramped temperature up to 150° C. Once devolatilized the system was restored to 1 atmosphere and the TBT was dispersed into the molten product. The material was then transferred to the inside rim of a plastic PBT box using a hot melt gun. After at least two weeks' cure at room temperature, the box assembly was then placed in a 130° C. oven for 30 minutes. The assembly was removed from the oven and immediately tested for the amount of force required to delaminate the lid from the box assembly. The results are given in Table 1.

TABLE 1

| | A | B | C | D |
| --- | --- | --- | --- | --- |
| RESIN 2 | 100 | 100 | 100 | 100 |
| FLUID B | 59 | 38.8 | 48 | 38.8 |
| SILAZANE | 15.3 | 15.3 | 15.3 | 30.6 |
| HMDZ | 38.0 | 38.8 | 38.8 | 19.4 |
| TFAA | 0.2 | 0.2 | 0.2 | 0.2 |
| TBT | 0.8 | 0.8 | 0.8 | 0.8 |
| R/P | 55/45 | 65/35 | 60/40 | 65/35 |
| ESTIMATED OH CONVERSION (MOLE %) | 12.5 | 12.5 | 12.5 | 25 |
| FORCE (N) | 293.6 | 298 | 324.7 | 622.7 |

EXAMPLE 2

A hot-melt pressure sensitive adhesives were prepared by loading 100 grams of Resin 2 and 38.8 grams of Fluid C into a flask under a $N_2$ sweep. The resin and fluid were blended well and heated to 100° C. 35.1 grams of silazane was added to the heated mixture. After 5 minutes, the $N_2$ sweep was stopped. 0.20 grams of trifluoroacetic acid (TFAA) was then added and the $N_2$ sweep resumed with the head space cleared. The mixture was held for 1 hour at 100° C. 19.4 grams of HMDZ was added and the mixture held at 100° C. for an additional 1 hour with the $N_2$ sweep at a maximum, followed by devolatilization at reduced pressure and at a ramped temperature up to 150° C. Once devolatilized the system was restored to 1 atmosphere and 0.8 grams of TBT was dispersed into the molten product. The material was then transferred to the inside rim of a plastic PBT box using a hot melt gun. After approximately two weeks at room temperature the box assembly was then placed in a 130° C. oven for 30 minutes. The assembly was removed from the oven and immediately tested for the amount of force required to de-laminate the lid from the box assembly. The push-out force was 195.7 N.

EXAMPLE 3

Using the amounts of components shown in Table 2, hot-melt pressure sensitive adhesives were prepared by loading Resin 2 and Fluid B into a flask under a $N_2$ sweep. The resin and fluid were blended well and heated to 100° C. Silazane was then added to the heated mixture. After 5 minutes, the $N_2$ sweep was stopped. Trifluoroacetic acid (TFAA) was then added and the $N_2$ sweep resumed with the head space cleared. The mixture was held for 1 hour at 100° C. HMDZ was then added and the mixture held at 100° C. for an additional 1 hour with the $N_2$ sweep at a maximum, followed by devolatilization at reduced pressure and at a ramped temperature up to 150° C. Once devolatilized the system was restored to 1 atmosphere and the TBT was dispersed into the molten product. The material was then transferred to the inside rim of a plastic PBT box using a hot melt gun. After at least two weeks' cure at room temperature, the assemblies were then placed in a 130° C. oven for 30 minutes. The assembly was removed from the oven and immediately tested for the amount of force required to de-laminate the lid from the box assembly. The results are given in Table 2.

TABLE 2

| | A | B | C | D | F |
| --- | --- | --- | --- | --- | --- |
| RESIN 2 | 100.3 | 100 | 100 | 100 | 100.3 |
| FLUID B | 59 | 59 | 59 | 59 | 59 |
| SILAZANE | 1.25 | 3.57 | 7.14 | 22.9 | 31.2 |
| HMDZ | 25.6 | 43.0 | 41.7 | 36.0 | 14.3 |
| TFAA | 0.26 | 0.2 | 0.2 | 0.2 | 0.26 |
| TBT | 1.05 | 0.8 | 0.8 | 0.8 | 1.05 |
| R/P | 55/45 | 55/45 | 55/45 | 55/45 | 55/45 |
| ESTIMATED CONVERSION (MOLE %) | 1.0 | 2.9 | 5.7 | 18.4 | 25.0 |
| FORCE (N) | 26.7 | 22.2 | 195.7 | 373.6 | 266.9 |

EXAMPLE 4

A hot-melt pressure sensitive adhesives were prepared by loading 200 grams of Resin 2 and 118.0 grams of Fluid F into a flask under a $N_2$ sweep. The resin and fluid were blended well and heated to 100° C. 30.6 grams of silazane was added to the heated mixture. After 5 minutes, the $N_2$ sweep was stopped. 0.40 grams of trifluoroacetic acid (TFAA) was then added and the $N_2$ sweep resumed with the head space cleared. The mixture was held for 1 hour at 100° C. 77.6 grams of HMDZ was added and the mixture held at 100° C. for an additional 1 hour with the $N_2$ sweep at a maximum, followed by devolatilization at reduced pressure and at a ramped temperature up to 150° C. Once devolatilized the system was restored to 1 atmosphere and 1.6 grams of TBT was dispersed into the molten product. The material was then transferred to the inside rim of a plastic PBT box using a hot melt gun. After one month cure at room temperature the box assembly was then place in a 130° C. oven for 30 minutes. The assembly was removed from the oven and immediately tested for the amount of force required to de-laminate the lid from the box assembly. The average amount of force to de-laminate the lid from the box was 876.3 N after 1 month at room temperature and 335.8 N at 130° C.

EXAMPLE 5

A hot-melt pressure sensitive adhesives were prepared by loading 200 grams of Resin 2 and 118.0 grams of Fluid G into a flask under a $N_2$ sweep. The resin and fluid were blended well and heated to 100° C. 30.6 grams of silazane was added to the heated mixture. After 5 minutes, the $N_2$ sweep was stopped. 0.40 grams of trifluoroacetic acid (TFAA) was then added and the $N_2$ sweep resumed with the head space cleared. The mixture was held for 1 hour at 100° C. 77.6 grams of HMDZ was added and the mixture held at 100° C. for an additional 1 hour with the $N_2$ sweep at a maximum, followed by devolatilization at reduced pressure and at a ramped temperature up to 150° C. Once devolatilized the system was restored to 1 atmosphere and 1.6 grams of TBT was dispersed into the molten product. The material was then transferred to the inside rim of a plastic PBT box using a hot melt gun. After one months cure at room temperature the box assembly was then place in a 130° C. oven for 30 minutes. The assembly was removed from the oven and immediately tested for the amount of force required to de-laminate the lid from the box assembly. The average amount of force to de-laminate the lid from the box was 676.1 N after 1 month at room temperature and 326.9 N at 130° C.

EXAMPLE 6

A hot-melt pressure sensitive adhesive was prepared by blending 28.8 grams of isobutyltrimethoxysilane with 675 grams of Resin 3. This blend was combined with 60 grams of Fluid D and 15.0 grams of silazane. 0.08 grams of $Sn(Oct)_2$ was added and the mixture was heated to 50° C. and held for 30 minutes. 0.75 grams of mercaptopropyltrimethoxysilane was added to neutralize the catalyst and the mixture was held at 50° C. for an additional 30 minutes. The mixture was then de-volatilized at reduced pressure and at a ramped temperature up to 150° C. Once devolatilized the system was restored to 1 atmosphere and 1.5 grams of TBT was dispersed into the molten product.

EXAMPLE 7

A hot-melt pressure sensitive adhesive was prepared by blending together 97.4 grams of Resin 3 and 10 grams of silazane. 0.20 grams of trifluoroacetic acid (TFAA) was then added and the mixture was held for 1 hour at 100° C. 40.0 grams of Fluid D was added to the mixture and blended well. The mixture was devolatilized at reduced pressure and at a ramped temperature up to 150° C. Once devolatilized the system was restored to 1 atmosphere and 1.0 grams of TBT was dispersed into the molten product.

EXAMPLE 8–10

Hot-melt pressure sensitive adhesives were prepared by blending together 97.4 grams of Resin 3 and 10.0 (Example 8), 5 (Example 9) and 2.5 (Example 10) grams of silazane. 40.0 grams of Fluid D was added to the mixture and the mixture was held for 1 hour at 100° C. The mixture was de-volatilized at reduced pressure and at a ramped temperature up to 150° C. Once devolatilized the system was restored to 1 atmosphere and 1.0 grams of TBT was dispersed into the molten product.

EXAMPLE 11

A hot-melt pressure sensitive adhesive was prepared by blending together 97.4 grams of Resin 3 and 10.0 grams of silazane. 40.0 grams of Fluid D was added to the mixture and the mixture was held for 1 hour at 100° C. The mixture was devolatilized at reduced pressure and at a ramped temperature up to 150° C. Once devolatilized the system was restored to 1 atmosphere and a mixture containing 1.0 grams of TBT and 0.5 grams of the reaction product of glycidoxypropyltrimethoxysilane and aminopropyltrimethoxysilane was dispersed into the molten product.

EXAMPLE 12

A hot-melt pressure sensitive adhesive was prepared by blending together 97.4 grams of Resin 3 and 10.0 grams of silazane. 0.05 grams of $Sn(Oct)_2$ was added and the mixture was heated to 100° C. and held for 30 minutes. 0.50 grams of mercaptopropyltrimethoxysilane was added to neutralize the catalyst and the mixture was held at 100° C. for an additional 30 minutes. 40.0 grams of Fluid D was then blended into the mixture. The mixture was then de-volatilized at reduced pressure and at a ramped temperature up to 150° C. Once devolatilized the system was restored to 1 atmosphere and 1.0 grams of TBT was dispersed into the molten product.

EXAMPLE 13

A hot-melt pressure sensitive adhesive was prepared by blending together 97.4 grams of Resin 3 and 10.0 grams of silazane. 0.05 grams of DBTDL was added and the mixture was heated to 100° C. and held for 30 minutes. 0.50 grams of mercaptopropyltrimethoxysilane was added to neutralize the catalyst and the mixture was held at 100° C. for an additional 30 minutes. 40.0 grams of Fluid D was then blended into the mixture. The mixture was then de-volatilized at reduced pressure and at a ramped temperature up to 150° C. Once devolatilized the system was restored to 1 atmosphere and 1.0 grams of TBT was dispersed into the molten product.

EXAMPLE 14

The hot-melt pressure sensitive adhesives prepared in Examples 9–16 were applied to an inside rim of a plastic PBT box using a hot melt gun. After one months cure at room temperature the box assembly was then place in a 130° C./150° C. oven for 30 minutes. The assembly was removed from the oven and immediately tested for the amount of force required to de-laminate the lid from the box assembly. The assemblies were also tested after being allowed to cure at room temperature for the periods given in Table 3.

TABLE 3

| | FORCE TO DE-LAMINATE (N) | | | | | | |
|---|---|---|---|---|---|---|---|
| EXAMPLE | 20 MIN | 1 HOUR | 1 DAY | 1 WEEK | 1 MONTH | 130° C. | 150° C. |
| 6 | 22.2 | 35.6 | 186.8 | 889.6 | 200 | 400.3 | 284.7 |
| 7 | 26.7 | 35.6 | 315.8 | >890 | 867.4 | 191.3 | 124.5 |
| 8 | 17.8 | 31.1 | 293.6 | >890 | 880.7 | 213.5 | 253.5 |
| 9 | 62.3 | 66.7 | 373.6 | 871.8 | >890 | 258.0 | 258.0 |
| 10 | 97.9 | 133.4 | 471.5 | 845.1 | 769.5 | 177.9 | 133.4 |
| 11 | 26.7 | 26.7 | 97.9 | 711.7 | >890 | 293.6 | 249.1 |
| 12 | 8.9 | 17.8 | 177.9 | — | >890 | 275.8 | 329.2 |
| 13 | 8.9 | 17.8 | 195.7 | — | >890 | 369.2 | 266.9 |

EXAMPLE 15

A hot-melt pressure sensitive adhesive was prepared by blending together 169.4 grams of Resin 2 and 11.1 grams of a mixture of 35 parts of 2,4,6-trisila-3,7-dioxa-2,4,4,5 -tetramethyl-6,6-dimethoxyoctane and 61 parts of 2,4,7-trisila -3,8-dioxa-2,4,4-trimethyl-7,7-dimethoxyoctane. To this mixture was added 19.6 grams of HMDZ. 0.10 grams of trifluoroacetic acid (TFAA) was then added and the mixture was held for 3 hour at 110° C. 40.0 grams of Fluid H was added to the mixture and blended well at 100° C. for at approximately 15 minutes. The mixture was de-volatilized at reduced pressure and at a ramped temperature up to 140° C. Once devolatilized the system was restored to 1 atmosphere and 2.0 grams of TBT and 1.0 gram of a reaction product of aminopropyltrimethoxy silane (26.4 parts), glycidoxypropyltrimethoxysilane (18.4 parts) and methyltrimethoxysilane (55.2 parts) were dispersed into the molten product. The material was then transferred to the inside rim of a plastic PBT box using a hot melt gun. The average force to delaminate after several minutes cure at room temperature was 75.6 N. The average amount of force to de-laminate the lid from the box was 631.6 N after 8 days' cure at room temperature.

EXAMPLE 16

203 grams of Resin 3 was combined with 12.21 grams of the reaction product of 29.7 grams of diethylhydroxylamine and 93.5 grams of a mixture of 35 parts of 2,4,6-trisila-3, 7-dioxa -2,4,4,5-tetramethyl-6,6-dimethoxyoctane and 61 parts of 2,4,7 -trisila-3,8-dioxa-2,4,4-trimethyl-7,7-dimethoxyoctane. The resulting mixture was heated to 100° C. and held for 1 hour. To the resulting resin was added 74.0 grams of Fluid H and 50 grams of heptane. The resulting mixture was held at reflux until no water was being produced. The mixture was then de-volatilized at reduced pressure and at a ramped temperature up to 150° C. Once devolatilized the system was restored to atmospheric pressure and 2.0 grams of TBT and 1.0 gram of a reaction product of aminopropyltrimethoxy silane (26.4 parts), glycidoxypropyltrimethoxysilane (18.4 parts) and methyltrimethoxysilane (55.2 parts) was dispersed into the molten product.

EXAMPLE 17

144.9 grams of Resin 3 and 14.96 grams of Silazane were combined. The resulting mixture was heated to 100° C. and held at this temperature for 2 hours. To the resulting product was added a dispersion of 60 grams of Fluid H and 37.5 grams of CaCO$_3$. The mixture was then de-volatilized at reduced pressure and at a ramped temperature up to 150° C. Once devolatilized the system was restored to atmospheric pressure and 1.5 grams of TBT and 0.75 grams of a reaction product of aminopropyltrimethoxy silane (26.4 parts), glycidoxypropyltrimethoxysilane (18.4 parts) and methyltrimethoxysilane (55.2 parts) was dispersed into the molten product.

What is claimed is:

1. A moisture-curable silicone hot melt pressure-sensitive adhesive composition comprising:

(A) a solid alkoxy functional organopolysiloxane resin containing curing radicals of the formula —ZSiR$^1_x$(OR$^2$)$_{3-x}$ produced by the method comprising reacting
   (i) a hydroxyl functional organopolysiloxane resin comprising R$_3$SiO$_{1/2}$ siloxane units and SiO$_{4/2}$ siloxane units, wherein the mole ratio of the R$_3$SiO$_{1/2}$ siloxane units to SiO$_{4/2}$ siloxane units has a value of from 0.5/1 to 1.2/1, and said hydroxyl content is 0.1 to 6 weight percent based on solids as determined by FTIR; with
   (ii) an alkoxy compound having the formula YSiR$^1_x$(OR$^2$)$_{3-x}$; wherein R is selected from the group consisting of hydrocarbon radicals and halogenated hydrocarbon radicals, R$^1$ is a monovalent hydrocarbon radical, R$^2$ is selected from the group consisting of a alkyl radical and alkoxyalkyl radical, Z is a divalent linking radical, Y is a radical which is reactive with the hydroxyl groups in the resin, and the subscript x has a value of 0 or 1;

(B) a diorganopolysiloxane polymer, each terminal group thereof containing at least one silicon-bonded hydrolyzable functional radical selected from the group consisting of hydroxyl radicals, alkoxy radicals having 1 to 4 carbon atoms, ketoxime radicals, aminoxy radicals, acetamido radicals, N-methylacetamido radicals and acetoxy radicals; said polymer having a viscosity at 25° C. of 20 to 60,000 mm$^2$/s, and the weight ratio of said resin to said polymer being in the range 40:60 to 80:20;

(C) sufficient catalyst to accelerate the cure of said composition;

said composition being an essentially solvent-free, non-slump solid at room temperature which cures to an essentially non-tacky elastomer upon exposure to moisture.

2. The composition as claimed in claim 1, wherein the curing radicals on the alkoxy functional organopolysiloxane resin (A) are selected from the group consisting of —CH$_2$CH$_2$Si(OMe)$_3$, —OSi(OMe)$_3$, —OSi(OMe)$_2$Me, —OMe$_2$SiCH$_2$CH$_2$Me$_2$SiCH$_2$CH$_2$Si(OMe)$_3$, —OMe$_2$SiCH$_2$CH$_2$Si(OMe)$_3$, —OMe$_2$SiOMe$_2$SiCH$_2$CH$_2$Si(OMe)$_3$, and —CH$_2$CH$_2$Me$_2$SiOMe$_2$SiCH$_2$CH$_2$Si(OMe)$_3$, wherein Me denotes a methyl radical.

3. The composition as claimed in claim 2, wherein the curing radicals on the alkoxy functional organopolysiloxane resin (A) are the group —OMe$_2$SiCH$_2$CH$_2$Si(OMe)$_3$, wherein Me denotes a methyl radical.

4. The composition as claimed in claim 1 wherein the alkoxy functional resin is produced by the method comprising reacting (i) hydroxyl functional organopolysiloxane resin having a hydroxyl content of 1 to 6 weight percent with (ii) an alkoxy compound of the formula {(MeO)$_3$Si(CH$_2$CH$_2$SiMe$_2$)$_a$(OSiMe$_2$)$_b$}$_2$NH wherein Me denotes methyl, subscript a has a value of 0 to 2 and subscript b has a value of 0 to 6.

5. The composition as claimed in claim 4 wherein the alkoxy compound (ii) is {(MeO)$_3$SiCH$_2$CH$_2$SiMe$_2$}NH, wherein Me denotes a methyl radical.

6. The composition as claimed in claim 1 wherein the alkoxy functional resin is produced by the method comprising reacting (i) hydroxyl functional organopolysiloxane resin having a hydroxyl content of 0.1 to 1.5 weight percent with (ii) an alkoxy compound of the formula {(MeO)$_3$Si(CH$_2$CH$_2$SiMe$_2$)$_a$(OSiMe$_2$)$_b$}$_2$NH wherein Me denotes methyl, subscript a has a value of 0 to 2 and subscript b has a value of 0 to 6.

7. The composition as claimed in claim 6 wherein the alkoxy compound (ii) is {(MeO)$_3$SiCH$_2$CH$_2$SiMe$_2$}$_2$NH, wherein Me denotes a methyl radical.

8. The composition as claimed in claim 1, wherein the viscosity of polydiorganosiloxane (B) is 350 to 60,000 mm$^2$/s at 25° C.

9. The composition as claimed in claim 1, wherein the terminal groups of polydiorganosiloxane (B) contain at least two alkoxy radicals selected from alkoxy groups having the formula —ZSiR$^1{}_x$(OR$^2$)$_{3-x}$ wherein R$^1$ is a monovalent hydrocarbon radical, R$^2$ is selected from the group consisting of a alkyl radical and alkoxyalkyl radical, Z is a divalent linking radical, and the subscript x has a value of 0 or 1.

10. The composition as claimed in claim 9, wherein the alkoxy radicals are selected from the group consisting of the structures (MeO)$_3$SiO—, Me(MeO)$_2$SiO—, (MeO)$_3$SiCH$_2$CH$_2$Si(Me$_2$)O— and —CH$_2$CH$_2$Si(Me)$_2$OSi(Me)$_2$CH$_2$CH$_2$Si(OMe)$_3$, in which Me denotes a methyl radical.

11. The composition as claimed in claim 10 wherein the alkoxy radicals are —CH$_2$CH$_2$Si(Me)$_2$OSi(Me)$_2$CH$_2$CH$_2$Si(OMe)$_3$, wherein Me denotes a methyl radical.

12. The composition as claimed in claim 10, wherein the alkoxy radicals are —O(Me$_2$)SiCH$_2$CH$_2$Si(OMe)$_3$ wherein Me denotes a methyl radical.

13. The composition as claimed in claim 1 wherein the terminal groups of polydiorganosiloxane (B) contain at least one ketoxime radical.

14. The composition as claimed in claim 1 wherein the terminal groups of polydiorganosiloxane (B) contain at least one aminoxy radical.

15. The composition as claimed in claim 1 wherein the terminal groups of polydiorganosiloxane (B) contain at least one acetamido radicals.

16. The composition as claimed in claim 1 wherein the terminal groups of polydiorganosiloxane (B) contain at least one N-methylacetamido radicals.

17. The composition as claimed in claim 1 wherein the terminal groups of polydiorganosiloxane (B) contain at least one acetoxy radical.

18. The composition as claimed in claim 1, wherein the weight ratio of resin (A) to polydiorganosiloxane (B) is 50:50 to 70:30.

19. The composition as claimed in claim 1, wherein the weight ratio of resin (A) to polydiorganosiloxane (B) is 55:45 to 65:35.

20. The composition as claimed in claim 1 wherein the catalyst (C) is tetra n-butyl titanate.

21. The composition as claimed in claim 1 wherein there is additionally present (D) a silane represented by monomers of the formula R$^4{}_{4-y}$SiX$_y$ or oligomeric reaction products thereof in which R$^4$ is selected from the group consisting of hydrocarbon radicals and substituted hydrocarbon radicals having 1–6 carbon atoms, X is a hydrolyzable group and y is 2 to 4.

22. The composition as claimed in claim 21 wherein X is selected from the group consisting of alkoxy radicals having 1 to 4 carbon atoms, ketoxime radicals, aminoxy radicals, acetamido radicals, N-methylacetamido radicals and acetoxy radicals.

23. The composition as claimed in claim 22, wherein X is an alkoxy radical having 1 to 4 carbon atoms.

24. The composition as claimed in claim 23, wherein the silane (D) is selected from the group consisting of methyltrimethoxysilane, methyltriethoxysilane, ethyltrimethoxysilane, propyltrimethoxysilane, tetramethoxysilane tetraethoxysilane, phenyltrimethoxysilane, isobutyltrimethoxysilane, glycidoxypropyltrimethoxysilane and aminoethylaminopropyltrimethoxysilane.

25. The composition as claimed in claim 24 wherein the silane (D) is isobutyltrimethoxysilane.

26. The composition as claimed in claim 22, wherein X is a ketoxime radical having the formula —ONC(R$^5$)$_2$ wherein each R$^5$ is independently an alkyl group having 1 to 6 carbon atoms or a phenyl group.

27. The composition as claimed in claim 26, wherein the silane (D) is selected from the group consisting of tetra(methylethylketoximo)silane, methyl-tris(methylethylketoximo)silane and vinyl-tris(methylethylketoximo)silane.

28. The composition as claimed in claim 22 wherein X is an acetoxy radical.

29. The composition as claimed in claim 28 wherein the silane (D) is selected from the group consisting of methyltriacetoxysilane, and ethyltriacetoxysilane.

30. The composition as claimed in claim 22 wherein X is an aminoxy radical.

31. The composition as claimed in claim 22 wherein X is an acetamido radical.

32. The composition as claimed in claim 22 wherein X is an N-methylacetamido radical.

* * * * *